May 6, 1958 R. W. KETCHLEDGE 2,834,005
OPTICAL STORAGE SYSTEM
Filed March 26, 1956
FIG. 1
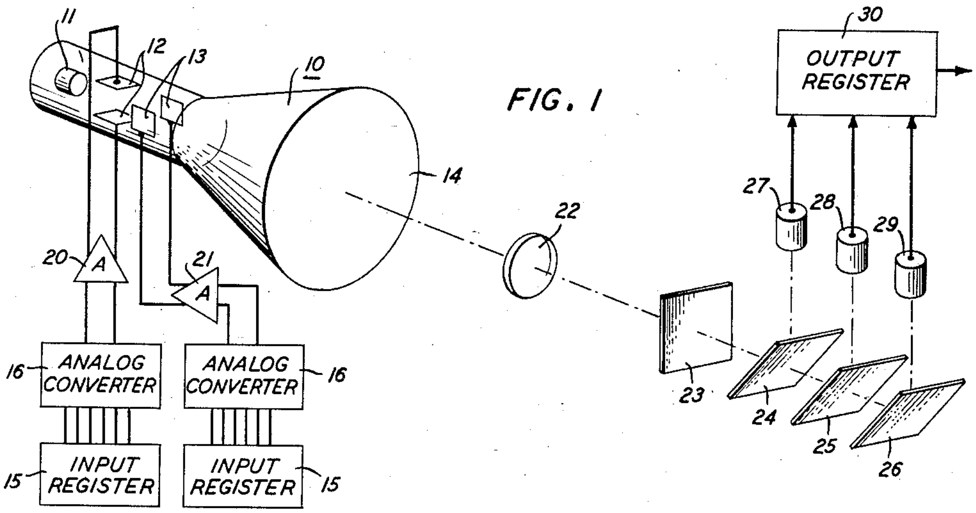
FIG. 2
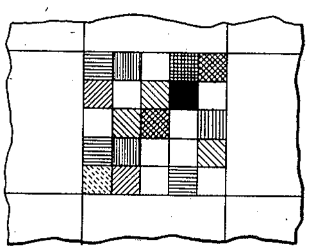
FIG. 3
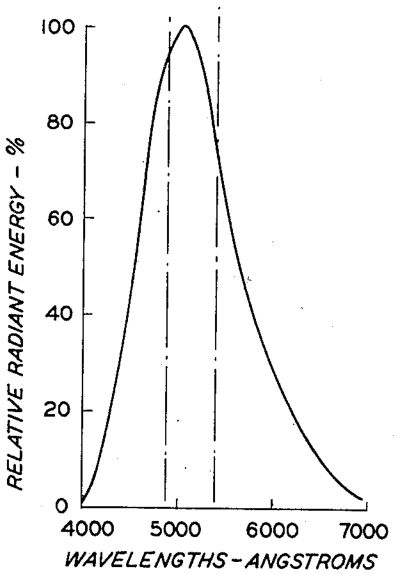
FIG. 4
| NO. | PHOTO RESPONSE 27 | 28 | 29 | COLOR ON SLIDE | ABSORPTION BANDS ANGSTROMS |
|---|---|---|---|---|---|
| 111 | ✓ | ✓ | ✓ | TRNSP'NT. | |
| 011 | | ✓ | ✓ | YELLOW | 4000-4900 |
| 101 | ✓ | | ✓ | RED-BLUE | 4900-5400 |
| 001 | | | ✓ | | 4000-5400 |
| 110 | ✓ | ✓ | | | 5400-7000 |
| 010 | | ✓ | | | 4000-4900, 5400-7000 |
| 100 | ✓ | | | | 4900-7000 |
| 000 | | | | OPAQUE | 4000-7000 |
INVENTOR
R. W. KETCHLEDGE
BY [signature]
ATTORNEY United States Patent Office 2,834,005
Patented May 6, 1958

2,834,005

OPTICAL STORAGE SYSTEM

Raymond W. Ketchledge, Whippany, N. J., assignor to Bell Telephone Laboratories, Incorporated, New York, N. Y., a corporation of New York Application March 26, 1956, Serial No. 573,989

18 Claims. (Cl. 340—173)

This invention relates to information storage systems and more particularly to such systems especially suitable for relatively permanent storage of large quantities of information.

One type of rapid access storage memory in which the stored information requires change at relatively infrequent intervals and which may be employed in memory or storage systems utilize electron discharge devices to provide a system of the type known as the flying spot store. Such a system is disclosed in R. C. Davis and R. E. Staehler patent application Serial No. 541,195, filed October 18, 1955.

In a flying spot storage system, a concentrated electron beam is projected from an electron gun of a cathode ray tube against the inner face of a luminescent screen or target thereof. An input signal deflects the electron beam to a particular discrete area of the screen. Light emanating from the spot produced by the beam impinging the discrete area of the screen is focused by a suitable lens system upon a discrete area of a storage surface. Each discrete area on the storage surface possesses peculiar light transmission characteristics such that a photosensitive device, positioned to receive light passing through the storage surface, will react to provide electrical output signals corresponding to the information contained in the area of light impingement on the storage slide. The electron beam and thus the consequent light beam, are deflected in two coordinate directions; for example, they may be repeatedly swept in one direction and selectively deflected in the other direction, or they may be deflected to a particular spot on the storage surface if completely random access is desired. The information is stored by a photographic process as opaque and nonopaque areas on the storage slide. Light passing through a nonopaque area represents one information condition and is indicated by an output signal from the photosensitive device, while light striking an opaque area of the slide fails to reach the photosensitive device, and lack of an output signal at this time indicates another information condition.

The number of completely separate bits of information that can be represented on the storage slides in such a system is limited by the spot size and shape. The number is increased by splitting the beam and focusing it through a multiple lens system simultaneously on a plurality of storage slides. The number can be increased further by deflecting the electron beam through wider angles so that the light beam traverses a greater area on the target surface. There are practical limits, however, to the width of the angle that can be employed. At first it might appear that more separate bits of information could be represented by a larger tube. Unfortunately, however, the spot size of the cathode ray beam tends to increase as the size of the tube increases, the consequent light beam increasing in size a corresponding amount. Also, the wider optical angles reduce the ability of the optical system to resolve the spots.

Additionally, information in such a system is stored in binary number representations, each discrete area representing a "zero" or "one" condition or "on" or "off" condition as the two binary code conditions are frequently described. Thus each such storage area can provide only one of two output conditions, and a plurality of such storage areas is required to supply the necessary binary digits or bits of information to form a binary code number or "word." For example, to read the number five from a storage system of this type in which the storage slides are prepared to incorporate the conventional binary number code, the light beam must pass through three discrete storage areas of respectively nonopaque, opaque and nonopaque conditions to provide output signals from the associated photosensitive device representing the binary digits 101, the binary number corresponding to the decimal number 5.

The physical size and discrete area storage capacity described in the above paragraphs confine the system capacity to limits too narrow for many applications. It therefore becomes necessary to operate a plurality of tubes concurrently or consecutively to increase system capacity, or alternatively, in accordance with this invention, to increase the information bearing capacity of each discrete area of the storage medium.

It is an object of this invention to provide an improved beam storage system.

It is another object of this invention to improve the operation of beam storage systems and particularly to increase the storage capacity of the system.

It is a further object of this inveniton to enable more rapid reading of information from a beam storage system.

These and other objects of this invention are attained in one specific embodiment thereof, wherein the information storage slide or slides comprise discrete areas of different light transmission characteristics such as are obtained by use of color filter material. In this specific embodiment a series of dichroic mirrors are aligned so as to receive light transmitted through a discrete area of the information storage slide and direct it to a series of photosensitive devices which in turn form electrical signals indicative of a binary number or numbers. Thus, for example, a discrete area of the information storage slide may be processed so as to pass or not pass light in any one of three wavelength bands. In this instance three dichroic mirrors would be positioned in alignment with the light beam passing through the slide so as to reflect light to corresponding photosensitive devices or transmit light to the next dichroic mirror in the line. Each dichroic mirror is arranged to reflect light in one of the three wavelength bands so that the first mirror will reflect light in one band to its associated photosensitive device and pass light in the remaining bands to the next mirror in line. Each photosensitive device responds to receipt of light from its associated mirror to provide an electrical signal. The signals from the three photosensitive devices may advantageously be inserted in an output register in parallel form to form a series of three binary digits which may then be transmitted to an output circuit in serial form.

It is a feature of this invention that information be stored on discrete areas of the information storage slide so as to provide distinct light transmission characteristics. It is a more particular feature of this invention that the discrete storage areas be processed to permit passage of light of certain wavelengths and to absorb light in all other wavelengths.

It is another feature of this invention that a series of dichroic mirrors be aligned to receive light transmitted through the information storage slide or the preceding mirror in alignment.

It is a further feature of this invention that a photosensitive device be associated with each dichroic mirror and positioned so as to receive light reflected by its associated mirror.

It is a still further feature of this invention that the photosensitive devices respond to light transmitted thereto to provide output signals, which signals when arranged consecutively correspond to the binary number indicated by the light transmission characteristic of the discrete storage slide area upon which the light beam impinges.

A complete understanding of this invention and of these and various other features thereof may be gained from consideration of the following detailed description and the accompanying drawing, in which:

Fig. 1 is a diagrammatic representation of one specific, illustrative embodiment of this invention;

Fig. 2 is a diagram of a portion of the storage slide employed in one specific embodiment of this invention drawn to a larger scale than that used in Fig. 1 to illustrate the arrangement of discrete information bearing areas on the storage slide;

Fig. 3 is a graphical representation of the light output of a typical phosphor for use in one specific illustrative embodiment of this invention; and Fig. 4 is a chart relating slide transmission characteristics to binary code numbers as utilized in one specific illustrative embodiment of this invention.

Referring now to the drawing, Fig. 1 depicts an illustrative embodiment of this invention utilizing a cathode ray tube 10. As known in the art, the tube 10 may advantageously comprise within an evacuated envelope, such as glass, an electron gun shown generally at 11. The electron gun produces a concentrated electron beam which is projected centrally between two pairs of deflection plates 12 and 13 mounted in space quadrature. The electron beam is projected against a target surface 14 which forms the face of the cathode ray tube and is coated with a luminescent material or phosphor. The deflection plates 12 and 13, which are energized from vertical and horizontal deflection circuits through deflection amplifiers 20 and 21, respectively, serve to deflect the electron beam to a desired discrete area of surface 14. The horizontal deflection circuitry advantageously is identical to the circuitry for vertical deflection so that a description of the horizontal circuitry will suffice to describe the structure and operation of this specific embodiment of this invention.

Binary information is fed into an input register 15 indicating a particular address or start location of information to be read out of the system. The input information for address location in each coordinate may consist of any suitable number of binary digits sufficient to locate the desired discrete storage area. Thus the input register 15 and its associated analog converter 16 may be of any of a number of circuits known in the art which are capable of generating analog representations on application thereto of simultaneous input pulses; for example, input register 15 may comprise a series of bistable flipflop units arranged to feed simultaneously through diodes of analog converter 16, thereby passing analog stepped amounts of current to amplifier 20 and 21 in the respective coordinate deflection circuits. Amplifiers 20 and 21 supply output voltages to the deflection plates 12 and 13 representing a summation of analog values in each deflection circuit.

The electron beam is deflected in accordance with the voltages applied to the deflection plates 12 and 13 so that it impinges a discrete area of the surface 14 and produces a spot of light thereat. A lens system comprising individual lenses such as 22 is positioned behind surface 14 to focus the resultant light on information storage slides such as slide 23. A plurality of slides such as 23 may be utilized so long as arranged consistent with output connections from pickup means associated with each slide.

Fig. 2 is a fragmentary view showing the construction of the information storage slide which may advantageously be employed in embodiments of this invention. A coating of a suitable photoemulsion is applied to a transparent base, such as a glass plate, and patterns of different color filter areas are formed in the emulsion in accordance with information which it is desired to store in the system. An example of a binary word which may be stored in the information storage slide 23 is shown in Fig. 2, considerably enlarged from actual size. Each discrete area may be processed to present any one of a plurality of different light transmission characteristics including transparent, opaque and various color filters capable of transmitting different levels or bands of light. The top two rows of discrete areas in Fig. 2 portray eight different light transmission characteristics; namely, three distinct color filter areas and combinations thereof, transparent and opaque.

As explained further hereinafter, each discrete area represents a number of bits or binary digits of the stored binary number or word. Increasing the number of different color filters employed on the discrete information areas with a corresponding increase in pickup devices will increase the bit storage potential of each discrete area and thus the storage capacity of the system.

Utilizing three different color filters and combinations thereof plus opaque and transparent, the twenty-five discrete areas of the storage slide illustrated in Fig. 2 are capable of storing seventy-five bits or binary digits or three bits in each discrete area. With $n$ different filters, each passing a different distinct wavelength band or combination thereof, any one of $2^n$ binary numbers of $n$ digits each can be written in a single discrete area. Commercially available types of color film operate on a "three color" basis and are suited, therefore, for storage of three binary digits at each spot.

Slide 23, Fig. 1, is arranged to provide one of eight binary digits per discrete area in accordance with the different filter areas shown in Fig. 2. Light passing through the slide 23 impinges mirror 24, the first of three dichroic mirrors 24, 25 and 26. Mirror 23 is designed to reflect light in a distinct wavelength band and to transmit light outside the reflected band. The reflected light activates a photosensitive device 27 which is made particularly sensitive to light in the reflected band and causes an electrical signal to be passed to output register 30 for temporary storage. The second mirror 25 in line reacts to light in substantially the same manner as mirror 24, reflecting impinging light in a wavelength band distinctly different from the band reflected by the first mirror 24 and transmitting any remaining light to the third mirror 26. Light reflected by mirror 25 activates its corresponding photosensitive device 28, and likewise light reflected from mirror 26 activates device 29. Signals from devices 28 and 29 are stored in output register 30, which then delivers all of the stored signals serially or simultaneously to the output circuit.

Fig. 3 illustrates the emission characteristic of a typical phosphor, such as that known commercially as the P24, which advantageously may be utilized in this specific emobdiment of this invention to provide substantial radiant energy in all desired wavelength bands and having a desirable rapid decay chaarcteristic. Thus phosphor P24 responds between approximately 4000 A. and 7000 A., peaking at approximately 5100 A. A division into three wavelength bands as shown in Fig. 3 provides adequate radiant energy in each band to produce a satisfactory response from the photosensitive devices.

Fig. 4 indicates the three digit binary numbers produced by the output signals of the photosensitive devices 27—29 in response to light transmitted through various color filter areas of the information storage slide in this specific embodiment of this invention. The spectral distribution of the P24 phosphor of Fig. 3 is divided into three wavelength bands; namely, 4000 A.–4900 A., 4900 A.–5400 A. and 5400 A.–7000 A. Various filter materials on the slide serve to absorb cerain bands and pass others. Thus a transparent discrete area passes the entire wavelength range and produces output signals from all three photosensitive devices 27–29 so as to store the binary number 111 or 7 in the output register 30. A yellow filter material on a discrete slide area absorbs the wavelength band 4000 A.–4900 A. Mirror 24 is arranged to reflect light only in this band so that photosensitive device 27 will not be activated by light passing through the yellow filter material and accordingly the stored binary number under these conditions will be 011 or 6. Other color filter materials absorb different wavelength bands to provide the remaining binary numbers from 1 to 5 inclusive and an opaque discrete area absorbs all the light so that none of the photosensitive devices are activated and the resultant output binary number signal is 000 or 0.

It is readily apparent that the system may be arranged to provide output signals in the conventional binary code as illustrated, in the reflected binary code or other known binary code systems. Information may be read from more than one discrete area in consecutive order to produce binary numbers of a higher order. Thus a six digit number may be produced from the consecutive outputs of two discrete storage areas, etc. The same result is attained by simultaneous readout from plural storage slides and gating of the resultant signals in proper order into the output register. In addition the capacity of a single discrete storage area may be increased by an increase in the number of possible light transmission characteristics and a corresponding increase in the number of dichroic mirrors and associated photosensitive devices. The circuitry and arrangements for accurately positioning the light beam on discrete areas of the storage slide and assuring readout of the desired information may be of the type disclosed in the aforementioned Davis and Staehler patent application.

It is to be understood that the above-described arrangements are illustrative of the application of the principles of the invention. Numerous other arrangements may be devised by those skilled in the art without departing from the spirit and scope of the invention.

What is claimed is:

1. A storage system comprising an electron discharge device including a luminescent surface, means for projecting an electron beam against said surface to produce a spot of light on the area of incidence and means for deflecting said electron beam, an information storage member having binary information stored on discrete areas thereof in a form providing frequency selective light transmission characteristics at various of the discrete areas, and a plurality of light responsive devices generating electrical manifestations of the light directed thereto from said surface through said information storage member.

2. A storage system comprising an electron discharge device including a luminescent surface, electron gun means for projecting an electron beam against said surface and means for deflecting said beam to particular spots on said surface, an information storage member positioned adjacent said surface to receive light therefrom, said member having binary information stored thereon in a form providing a plurality of different light transmission characteristics at various discrete areas thereof, a plurality of light sensitive devices and means for selectively directing light transmitted through a single discrete area of said member to various ones of said light sensitive devices, said light sensitive devices producing output electrical signals dependent upon the receipt of light thereat.

3. A storage system in accordance with claim 2 wherein each of said discrete areas of said information storage member represents a plurality of digits of a binary number and comprises one of a plurality of different color filters.

4. A storage system in accordance with claim 2 wherein said directing means includes a plurality of dichroic mirrors, each of said mirrors disposed to reflect light of certain wavelengths and to pass light of all other wavelengths therethrough.

5. A storage system in accordance with claim 4 wherein said plurality of dichroic mirrors is positioned in alignment with said information storage member such that light transmitted through said information storage member impinges only the first of said mirrors and succeeding ones of said mirrors in alignment receive light only from the preceding one of said mirrors in alignment.

6. A storage system comprising a cathode ray tube including a luminescent surface, means for projecting an electron beam against said surface to produce a spot of light on the area of incidence, and means for deflecting said electron beam, an information storage member, optical means for focusing the light from said area of incidence upon said information storage member, said member having binary information stored thereon in a form providing a plurality of different light transmission characteristics at various discrete areas thereof, light responsive means for generating electrical manifestations of the light transmitted thereto, and means for selectively directing the light transmitted through a single discrete area of said information storage member to distinct ones of said light responsive means dependent on the light transmission characteristic of said discrete area.

7. A storage system in accordance with claim 6 wherein each of said discrete areas of said information storage member represents a plurality of digits of a binary number and comprises one of a plurality of different color filters.

8. A storage system in accordance with claim 6 wherein said directing means includes a plurality of dichroic mirrors, each of said mirrors disposed to reflect light of certain wavelengths and to pass light of all other wavelengths therethrough.

9. A storage system in accordance with claim 8 wherein said plurality of dichroic mirrors is positioned in alignment with said information storage member such that light transmitted through said information storage slide impinges only the first of said mirrors and succeeding ones of said mirrors in alignment receive light only from the preceding one of said mirrors in alignment.

10. A storage system comprising a cathode ray tube including a luminescent surface, means for projecting an electron beam against said surface to produce a spot of light on the area of incidence and means for deflecting said electron beam, an information storage member having binary information stored thereon in the form of light filter areas, output means, a plurality of light sensitive devices, and a plurality of dichroic mirrors positioned so as to reflect light received from said luminescent surface through said information storage member to said light sensitive devices, said light sensitive devices responsive to receipt of light thereat to apply electrical signals to said output means.

11. A storage system in accordance with claim 10 in which said output means comprises an output register for receiving electrical signals from said light sensitive devices in parallel form and for transmitting said signals sequentially to an output circuit in proper order to represent the binary information stored on a discrete area of said information storage member.

12. A storage system in accordance with claim 10 in which said output means includes gating means connected to said light sensitive devices for transmitting electrical signals representing the binary information stored on a discrete area of said information storage member in response to electrical signals from said light sensitive devices.

13. A storage system comprising an information storage slide having binary information stored on discrete areas thereof, said discrete areas of said slide being arranged to absorb light of certain wavelengths and to transmit therethrough light of all other wavelengths, a plurality of light sensitive devices, means for focusing a light beam on one of said discrete areas, a series of dichroic mirrors arranged in alignment with said slide such that light transmitted through said slide impinges the first of said series of mirrors, each of said mirrors arranged to reflect light of certain wavelengths to a corresponding one of said light sensitive devices and to transmit light of all other wavelengths received thereat to the next in line of said series of dichroic mirrors, said light sensitive devices responsive to receipt of light thereat to generate electrical output signals.

14. A storage system comprising an information storage member having a plurality of digits of a binary number stored at each of a plurality of discrete areas thereof as one of a plurality of different light transmission characteristics, means for focusing a light beam on one of said discrete areas, a plurality of light sensitive devices and means directing light transmitted through a single discrete area of said storage member to various ones of said light sensitive devices, said light sensitive devices responsive to light received from said directing means to generate electrical signals sequentially forming a series of binary digits corresponding to the binary digits stored at said discrete area of said storage member.

15. A storage system comprising an information storage member having each of a plurality of discrete areas thereof processed to present one of a plurality of different light transmission characteristics, each characteristic corresponding to a plurality of binary number digits, means for directing a light beam to any one of said plurality of discrete areas, a plurality of light sensitive devices, dichroic mirror means associated with each of said light sensitive devices and arranged to reflect light of certain wavelengths received thereat through one of said discrete areas of said storage member to said associated light sensitive device, and an output register, said light sensitive devices responsive to receipt of light from said associated mirror means to generate electrical signals for storage in said output register in an arrangement such as to present a plurality of digits of a binary number corresponding to the plurality of digits stored on said one of said discrete areas of said storage member.

16. A storage system comprising an electron discharge device including a luminescent surface, means for projecting an electron beam against said surface and means for deflecting said electron beam, an information storage member having $n$ binary digits stored on each of a plurality of discrete areas thereof, each of said discrete areas arranged to transmit light of certain wavelengths therethrough, $n$ light responsive devices, $n$ dichroic mirrors, each of said $n$ dichroic mirrors arranged to reflect light of certain wavelengths received from said luminescent surface through said information storage member to a corresponding one of said $n$ light responsive devices, and output means, said $n$ light responsive devices generating electrical manifestations of the light reflected thereto so as to produce one of $2^n$ binary numbers in said output means.

17. A storage system in accordance with claim 16 wherein said plurality of dichroic mirrors is positioned in alignment with said information storage member such that light transmitted through said information storage member impinges only the first of said mirrors and succeeding ones of said mirrors in alignment receive light only from the preceding one of said mirrors in alignment.

18. A storage system in accordance with claim 16 in which said output means comprises an output register for receiving electrical signals from said light responsive devices in parallel form and for transmitting said signals sequentially to an output circuit in proper order to represent the binary information stored on a discrete area of said information storage member.

No references cited.